(12) United States Patent
Zhang

(10) Patent No.: US 10,084,777 B2
(45) Date of Patent: Sep. 25, 2018

(54) SECURE DATA PROCESSING METHOD AND SYSTEM

(71) Applicant: BEIJING QIHOO TECHNOLOGY COMPANY LIMITED, Beijing (CN)

(72) Inventor: Jiazhu Zhang, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 48 days.

(21) Appl. No.: 14/646,306

(22) PCT Filed: Sep. 17, 2013

(86) PCT No.: PCT/CN2013/083615
§ 371 (c)(1),
(2) Date: May 20, 2015

(87) PCT Pub. No.: WO2014/079266
PCT Pub. Date: May 30, 2014

(65) Prior Publication Data
US 2015/0341351 A1 Nov. 26, 2015

(30) Foreign Application Priority Data
Nov. 26, 2012 (CN) .......................... 2012 1 0488721

(51) Int. Cl.
*H04L 29/06* (2006.01)
(52) U.S. Cl.
CPC .......... *H04L 63/0876* (2013.01); *H04L 63/10* (2013.01); *H04L 63/20* (2013.01)
(58) Field of Classification Search
CPC ...... H04L 63/10; H04L 63/20; H04L 63/0876
(Continued)

(56) References Cited

U.S. PATENT DOCUMENTS 5,987,132 A * 11/1999 Rowney ............. G06Q 30/0611
705/26.4
7,079,499 B1 * 7/2006 Akhtar .................... H04L 63/08
370/310
(Continued)

OTHER PUBLICATIONS

Hongyi, Z. et al., English abstract only of Chinese application No. CN101924761A, Method for detecting malicious program according to white list, publication date Dec. 22, 2010, one page.
(Continued)

*Primary Examiner* — Daniel Potratz
*Assistant Examiner* — William B Jones
(74) *Attorney, Agent, or Firm* — Baker & Hostetler LLP

(57) ABSTRACT

The invention discloses a secure data processing method and system, wherein the secure data processing method comprises the following steps of: a security control server receiving a data upload request from a terminal, and obtaining a file feature, an identification code of the terminal and a directory path of a file with the file feature in the terminal comprised in the data upload request; the security control server judging whether the terminal is a trustable machine and/or judging whether the directory path is a credit directory according to the identification code and/or the directory path, and if the terminal is a trustable machine and/or the directory path is a credit directory, adding the uploaded file feature into a security database, or otherwise, not adding it into the security database; the trustable machine is a terminal in which data is considered as secure data. The invention further provides a secure data processing system implementing the foregoing method. The secure data processing method and system can improve the update efficiency of the secure data.

12 Claims, 3 Drawing Sheets

(58) Field of Classification Search
USPC .......................................................... 726/7
See application file for complete search history.

(56) References Cited

U.S. PATENT DOCUMENTS

| | | | |
|---|---|---|---|
| 2004/0064351 A1* | 4/2004 | Mikurak | G06Q 10/087 705/22 |
| 2009/0300744 A1* | 12/2009 | Guo | H04L 63/0823 726/7 |
| 2012/0066670 A1* | 3/2012 | McCarthy | G06F 9/5072 717/169 |
| 2012/0259635 A1 | 10/2012 | Ekchian et al. | |
| 2012/0284767 A1* | 11/2012 | Hockings | G06F 21/31 726/1 |

OTHER PUBLICATIONS

Houxian, L. et al., English abstract only of Chinese application No. CN102571703A, Security control system and security control method for cloud data, publication date Jul. 11, 2012, one page.

Zhaohui, S., English abstract only of Chinese application No. CN102736978A, Method and device for detecting installation status of application program, publication date Oct. 17, 2012, one page.

International Search Report regarding PCT/CN2013/083615, dated Dec. 19, 2013, 2 pages.

Zhang, J., English abstract only of Chinese application No. CN103023882A, Method and system for judging data security, publication date Apr. 3, 2013, one page.

Wang, F., English abstract only of the design and implementation of a white list active defense system, China Master Theses Full-text Database (electronic journal), 2012, one page.

\* cited by examiner

SECURE DATA PROCESSING METHOD AND SYSTEM

FIELD OF THE INVENTION

The invention relates to the field of computer technologies, and in particular, to a secure data processing method and system.

BACKGROUND OF THE INVENTION

A private cloud is a computer security system separately deployed for an enterprise, and it can effectively ensure the security of the internal data. In general, in a private cloud system, a terminal uploads file feature information, the security of which cannot be identified locally, to a security control server, and the security control server identifies the file feature information via a security information database stored internally, and transfers the identification result to the terminal, thereby realizing a security management for the internal data.

Such a way can guarantee the security of the internal data of the enterprise, however, when the amount of data uploaded to the security control server is larger, or the amount of concurrent upload is large, the security control server is unable to respond rapidly, which decreases the processing efficiency, and in a serious case, it may even result in the problem that the security control server cannot respond, and the like. When there is no relevant file feature information in the security control server, the file feature information uploaded by the terminal cannot be identified, and therefore, such a way poses a high requirement for the timeliness of data in the security information database in the security control server. In order to guarantee an effective and accurate identification of the file feature information uploaded by the terminal, the security control server needs to update the security information data in real time and rapidly, however, currently, this needs to be implemented by a manual operation, or by an one-by-one comparison for the file features, the time taken in updating is long, and the efficiency is low.

SUMMARY OF THE INVENTION

In view of the above problems, the invention is proposed to provide a secure data processing method and system, which can overcome the above problems or at least partly solve or mitigate the above problems.

According to an aspect of the invention, there is provided a secure data processing method comprising the following steps of:

a security control server receiving a data upload request from a terminal, and obtaining a file feature, an identification code of the terminal and a directory path of a file with the file feature in the terminal comprised in the data upload request;

the security control server judging whether the terminal is a trustable machine and/or judging whether the directory path is a credit directory according to the identification code and/or the directory path, and if the terminal is a trustable machine and/or the directory path is a credit directory, adding the uploaded file feature into a security database, or otherwise, not adding it into the security database; wherein the trustable machine is a terminal in which data is considered as secure data.

According to another aspect of the invention, there is provided a secure data processing system disposed in a security control server and comprising:

an information obtaining module configured to receive a data upload request from a terminal, and obtain a file feature, an identification code of the terminal and a directory path of a file with the file feature in the terminal comprised in the data upload request;

a security information identification module configured to judge whether the terminal is a trustable machine and/or judge whether the directory path is a credit directory according to the identification code and/or the directory path, and if the terminal is a trustable machine and/or the directory path is a credit directory, add the uploaded file feature into a security database, or otherwise, not add it into the security database, wherein the trustable machine is a terminal in which data is considered as secure data.

According to yet another aspect of the invention, there is provided a computer program comprising a computer readable code which causes a server to perform the secure data processing method according to any of claims 1-6, when said computer readable code is running on the server.

According to still another aspect of the invention, there is provided a computer readable medium storing the computer program as claimed in claim 12 therein.

The beneficial effects of the invention lie in that:

in the secure data processing method and system of the invention, by the foregoing judgment of whether the terminal is a trustable machine and/or arranging a credit directory in a trustable machine, it not only can judge whether the terminal is a trustable machine, but also can judge a directory path of a file in the terminal, only if the terminal is a trustable machine and/or the directory path of a file in the terminal is a credit directory, the terminal will be trusted by a security control server, and the security control server may then add the file feature uploaded by the terminal trusted by it into a security database according to the judgment result, thereby realizing a real-time update of the security database. In the process of the update, the security of the uploaded file feature is judged by identifying a terminal pre-set to be secure, there is no need of a comparison for the file feature, and the identification process is simple, with a high efficiency, and at the same time can ensure the security of the data.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

The secure data processing method of the invention processes the data security in an intranet, and is applied in a private cloud system internal to an enterprise. A security control server in the private cloud system carries out the identification and judgment, accomplishes the update of a security database in the intranet, and guarantees the timeliness and efficiency of the update of the security database. Therein, the security control server refers to a service side set to be secure in the private cloud system. In general, there may be only one service side in the private cloud system, or there are a plurality of service sides, all the service sides need to be guaranteed to be secure, at this point, the security control server may also be all the service sides.

Figure 1:
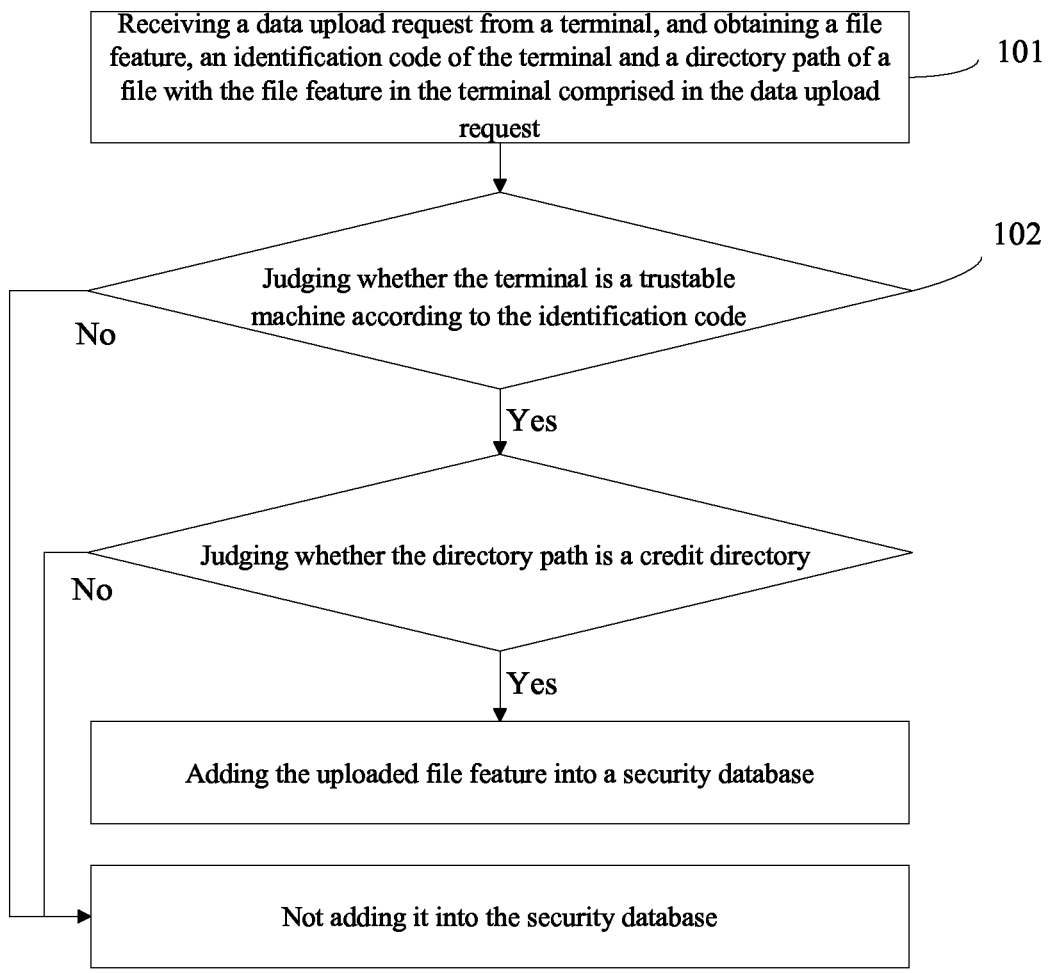
FIG. 1 shows schematically a flow chart of a secure data processing method according to an embodiment of the invention.

Reference is made to FIG. 1, which shows a first embodiment of a secure data processing method of the invention comprising the following steps.

At step 101, a security control server receives a data upload request from a terminal, and obtains a file feature, an identification code of the terminal and a directory path of a file with the file feature in the terminal comprised in the data upload request.

In the security control server of a private cloud system, identification codes of all the terminals in data interaction with the security control server are pre-stored. In particular, they may be stored in the form of a configuration file, a relationship table, etc. Therein, the identification code of a terminal may be an identification such as a serial number, a feature code, etc. of the terminal which can uniquely identify the terminal. The file feature may be the MD5 value of a file, or other identification data which can identify the file.

When a terminal uploads data to the security control server, an identification code of the terminal, a file feature required to be uploaded and a directory path of a file with the file feature in the terminal will be contained in a data upload request. The security control server can directly obtain these pieces of information from the upload request from the terminal.

At step 102, the security control server judges whether the terminal is a trustable machine according to the identification code and judges whether the directory path is a credit directory, and if the terminal is a trustable machine and the directory path is a credit directory, adds the uploaded file feature into a security database, or otherwise, does not add it into the security database; wherein the trustable machine is a terminal, the data of which is considered as secure data.

Therein, the trustable machine can be manually set and maintained, that is, a security information operator can set the levels of some terminals in the private cloud system to be secure according to a predetermined rule and manner, namely, set these terminals to be trustable machines, and store relevant information in the security control server, and the security control server can then trust these terminals. For a terminal set to be a trustable machine, all data therein will be regarded as secure data, and any file or file feature information uploaded by it can be considered secure.

In particular, whether a terminal is a trustable machine or not will be identified in advance in the security control server, and the relevant identification can be stored in the configuration file or the relationship table. When obtaining the identification code of a terminal, the security control server can judge whether the terminal is a trustable machine by querying the configuration file or the relationship table.

In addition, the security control server may further judge whether the directory path is a credit directory, at this point, may compare the directory path with a credit directory pre-stored in the security control server, and if identical, determine that the directory path is a credit directory, or otherwise, determine that it is not a credit directory.

Therein, a directory path may contain information such as the IP address of a terminal, etc. which can identify the terminal where the path is located, namely, each directory path is unique, and at this point, the directory path may correspond to a particular terminal in addition to representing a particular directory. In such a case, a judgment can be made directly by the directory path, that is, as long as it can be judged that the directory path is a credit directory, it can be determined that the terminal where the directory path is located is a trustable machine, and thereby there is no need for a separate judgment of whether the terminal is a trustable machine.

It can be appreciated that the directory path may also be a general path, e.g., c:\test\. In this case, it is necessary to simultaneously judge whether the terminal is a trustable machine and whether the directory path is a credit directory, and by combining the both, it is judged whether to add the uploaded file feature information into the security database, since two judgments are passed, the security of the data may be further guaranteed.

It can be appreciated that FIG. 1 shows only one of the above described several possible situations, namely, simultaneously judging whether the terminal is a trustable machine and whether the directory path is a credit directory. As described above, the invention may further comprise only judging whether the terminal is a trustable machine or whether the directory path is a credit directory, which will not be repeated here.

According to the foregoing description, when the terminal is a trustable machine, or the directory path is a credit directory, or the both are satisfied at the same time, the security control server will add the uploaded file feature into the security database, and the specifics may be determined according to the actual situation.

When the above conditions cannot be met, the file feature will not be added into the security database, and at this point, the upload request may be processed according to the actual situation. If the upload request is to request adding the file feature into the security database, the security control server may deny this upload request or may not respond, and if the upload request is to request identifying the file feature, then the file feature may be compared with information already stored in the security database, and then the identification result is returned to the terminal.

It can be appreciated that for file features added into the security database, the security control server can use them for the security management of the intranet data, for example, for comparing and identifying file features uploaded by other terminals, for example, for judging the security of a subsequently uploaded file feature, etc.

Therein, the terminal accomplishes communication with the security control server by the get or post request of the http protocol.

In the following, the foregoing process will be described in detail in connection with a particular example.

For example, the ip of the security control server is 10.20.30.40 and the port number is 54360, then the protocol requesting for a setting of the security control server will send a request of the Get or post method of the http for url: http://10.20.30.40:54360/get_config, and pass the unique code mid of the terminal as a parameter to the security control server, and upon receiving the request, the security control server will call a corresponding script for processing, obtain relevant settings of the terminal in a corresponding database, for example, whether the terminal is a trustable machine and whether the directory path is a credit directory, and return a setting option. The format of the option is in the form of K/V, for example, is_trust=true carriage return trust_dir=c:\test\;d:\program files\; carriage return. Thus, in the case of the security control server receiving a file of an authorized trusted directory from a trustable machine, when the terminal uploads file information, it will also send a directory path where its file is located and an identification code to the security control server, and after reception, the security control server will judge whether the terminal is a trustable machine according to the identification code, and compare the directory path with credit directories in the settings at the security control server side, and only if it is judged to be among the credit directories, the security control server will add the uploaded file feature into the security database, otherwise, will not add it into the security database.

In the secure data processing method and system of the invention, by the foregoing judgment of whether the terminal is a trustable machine and/or arranging a credit directory in a trustable machine, it not only can judge whether the terminal is a trustable machine, but also cab judge a directory path of a file in the terminal, only if the terminal is a trustable machine and/or the directory path of a file in the terminal is a credit directory, the terminal will be trusted by a security control server, and the security control server may then add the file feature uploaded by the terminal trusted by it into a security database according to the judgment result, thereby realizing a real-time update of the security database. In the process of the update, the security of the uploaded file feature is judged by identifying a terminal pre-set to be secure, there is no need of a comparison for the file feature, and the identification process is simple, with a high efficiency, and at the same time can ensure the security of the data.

Figure 2:
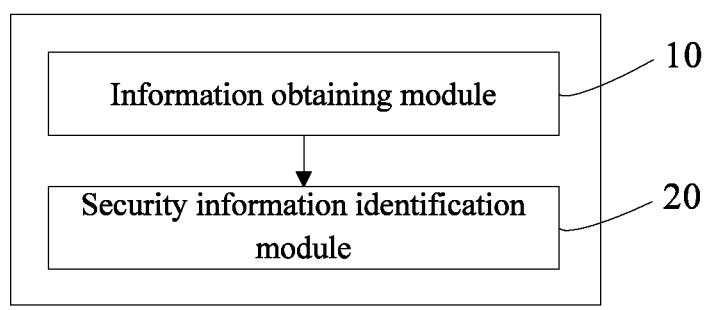
FIG. 2 shows schematically a block diagram of a secure data processing system according to a first embodiment of the invention.

Reference is made to FIG. 2, which shows a first embodiment of a secure data processing system of the invention positioned in a security control server and comprising an information obtaining module 10 and a security information identification module 20.

The information obtaining module 10 is configured to receive a data upload request from a terminal, and obtain a file feature, an identification code of the terminal and a directory path of a file with the file feature in the terminal comprised in the data upload request.

The security information identification module 20 is configured to judge whether the terminal is a trustable machine and/or judge whether the directory path is a credit directory according to the identification code and/or the directory path, and if the terminal is a trustable machine and/or the directory path is a credit directory, add the uploaded file feature into a security database, or otherwise, not add it into the security database, wherein the trustable machine is a terminal in which data is considered as secure data.

Preferably, the security information identification module 20 comprises a trustable machine judging sub-module configured to compare the identification code with an identification code of a trustable machine pre-stored in the security control server, and if identical, determine that the terminal is a trustable machine, or otherwise, determine that the terminal is not a trustable machine.

It can be appreciated that the security information identification module 20 further comprises a credit directory judging sub-module configured to compare the directory path with a credit directory pre-stored in the security control server, and if identical, determine that the directory path is a credit directory, or otherwise, determine that it is not a credit directory. It can be appreciated that the system further comprises an identification comparison module configured to identify the security of file feature information uploaded by other terminals employing file features added into the security database.

Figure 3:
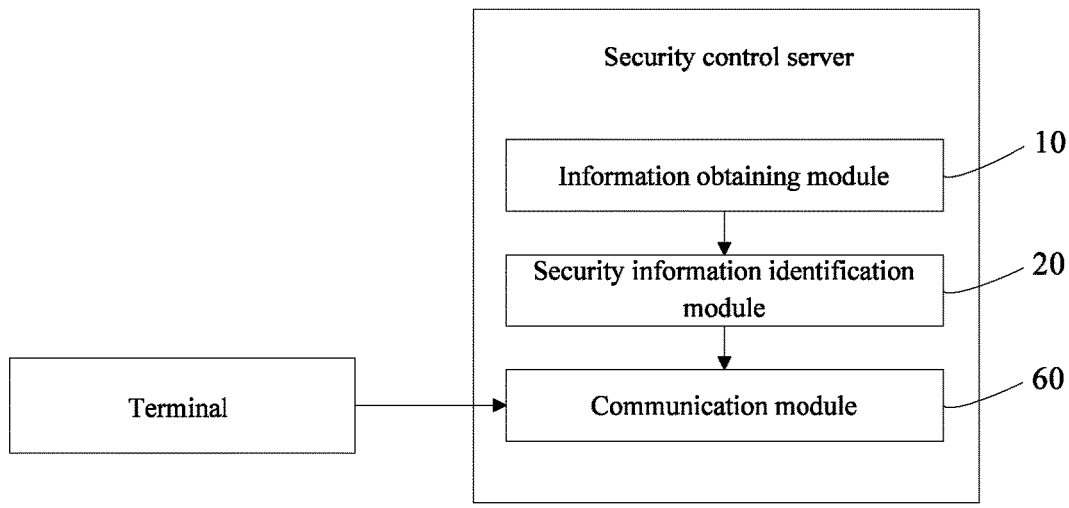
FIG. 3 shows schematically a block diagram of a secure data processing system according to a second embodiment of the invention.

Reference is made to FIG. 3, which shows a second embodiment of a secure data processing system of the application. The secure data processing system further comprises a communication module 60 configured to accomplish communication of the terminal with the security control server through the get or post request of the http protocol.

Embodiments of the individual components of the invention may be implemented in hardware, or in a software module running on one or more processors, or in a combination thereof. It will be appreciated by those skilled in the art that, in practice, some or all of the functions of some or all of the components in a secure data processing system according to individual embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 4:
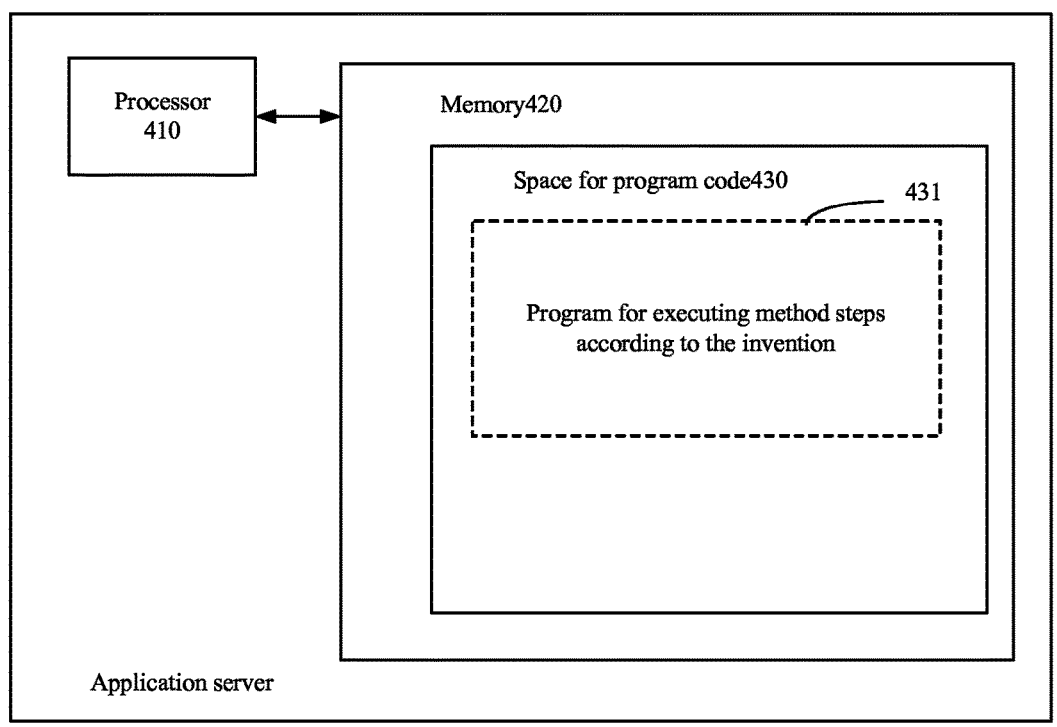
FIG. 4 shows schematically a block diagram of a server for performing a method according to the invention.
Figure 5:
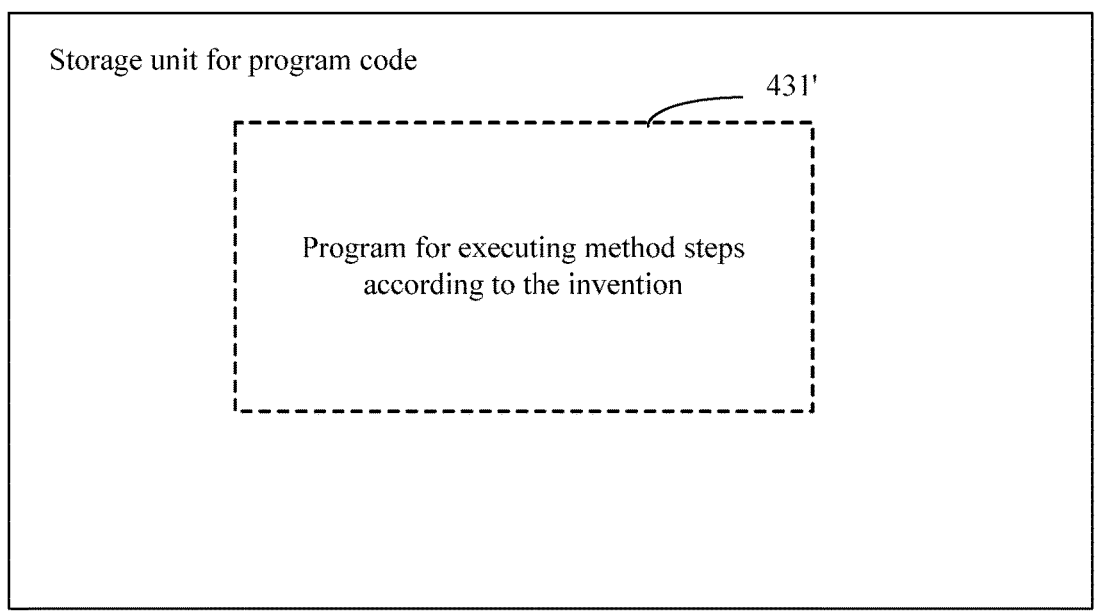
FIG. 5 shows schematically a storage unit for retaining or carrying a program code implementing a method according to the invention.

For example, FIG. 4 shows a server which may carry out a secure data processing method according to the invention, e.g., an application server. The server traditionally comprises a processor 410 and a computer program product or a computer readable medium in the form of a memory 420. The memory 420 may be an electronic memory such as a flash memory, an EEPROM (electrically erasable programmable read-only memory), an EPROM, a hard disk or a ROM. The memory 420 has a memory space 430 for a program code 431 for carrying out any method steps in the methods as described above. For example, the memory space 430 for a program code may comprise individual program codes 431 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 5. The storage unit may have a memory segment, a memory space, etc. arranged similarly to the memory 420 in the server of FIG. 4. The program code may for example be compressed in an appropriate form. In general, the storage unit comprises a computer readable code 431', i.e., a code which may be read by e.g., a processor such as 410, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several means, several of the means may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A method for improving an enterprise intranet of a private cloud system, comprising:
   identifying at least one terminal among a plurality of terminals in the enterprise intranet as at least one trustworthy machine according to a predetermined rule, wherein the predetermined rule pre-sets the level of the at least one terminal as trustworthy;
   storing identification information of the at least one trustworthy machine in a server, wherein the server performs security control over the enterprise intranet based at least in part on the stored identification information;
   receiving, from a first terminal among the plurality of terminals in the enterprise intranet, an upload request for adding a file feature into a security database in the enterprise intranet, wherein the request includes an identification code of the first terminal, a directory path of a file in the first terminal, and the file feature, and the file feature is identification data for identifying the file;
   determining whether the first terminal is a trustworthy machine by comparing the identification code of the first terminal to the identification information of the at least one trustworthy machine stored in the server;
   adding the file feature into the security database in the enterprise intranet in response to the determination that the identification code of the first terminal matches identification information of one of the at least one trustworthy machine; and
   determining whether file feature information uploaded by a second terminal among the plurality of terminals in the enterprise intranet is secure based on the file feature added in the security database in the enterprise intranet by the first terminal.

2. The method as claimed in claim 1, further comprising: comparing the identification code with an identification code of a trustable machine pre-stored in the server, and if identical, determining that the terminal is a trustable machine, or otherwise, determining that the terminal is not a trustable machine.

3. The method as claimed in claim 1, further comprising: comparing the directory path with a credit directory pre-stored in the server, and if identical, determining that the directory path is a credit directory, or otherwise, determining that it is not a credit directory.

4. The method as claimed in claim 1, wherein communications of the plurality of terminals with the server is accomplished through a get or post request of a http protocol.

5. The method of claim 1, wherein the identification information of the at least one trustworthy machine is stored in a configuration file or a relationship table of the server.

6. A system for improving an enterprise intranet of a private cloud system:
   a processor; and
   a memory communicatively coupled to the processor and storing instructions that upon execution by the processor cause the system to:
   identify at least one terminal among a plurality of terminals in the enterprise intranet as at least one trustworthy machine according to a predetermined rule, wherein the predetermined rule pre-sets the level of the at least one terminal as trustworthy;
   store identification information of the at least one trustworthy machine in a server, wherein the server performs security control over the enterprise intranet based at least in part on the stored identification information;
   receive, from a first terminal among the plurality of terminals in the enterprise intranet, an upload request for adding a file feature into a security database in the enterprise intranet, wherein the request includes an identification code of the first terminal, a directory path of a file in the first terminal, and the file feature, and the file feature is identification data for identifying the file;
   determine whether the first terminal is a trustworthy machine by comparing the identification code of the first terminal to the identification information of the at least one trustworthy machine stored in the server;
   add the file feature into the security database in the enterprise intranet in response to the determination that the identification code of the first terminal matches identification information of one of the at least one trustworthy machine; and
   determine whether file feature information uploaded by a second terminal among the plurality of terminals in the enterprise intranet is secure based on the file feature added in the security database in the enterprise intranet by the first terminal.

7. The system as claimed in claim 6, wherein the memory further storing instructions that upon execution by the processor cause the system to:
compare the identification code with an identification code of a trustable machine pre-stored in the server, and if identical, determine that the terminal is a trustable machine, or otherwise, determine that the terminal is not a trustable machine.

8. The system as claimed in claim 6, wherein the memory further storing instructions that upon execution by the processor cause the system to:
compare the directory path with a credit directory pre-stored in the server, and if identical, determine that the directory path is a credit directory, or otherwise, determine that it is not a credit directory.

9. The system as claimed in claim 6, wherein the memory further storing instructions that upon execution by the processor cause the system to:
accomplish communications of the plurality of terminals with the server through a get or post request of a http protocol.

10. The system of claim 6, wherein the identification information of the at least one trustworthy machine is stored in a configuration file or a relationship table of the server.

11. A non-transitory computer readable medium having instructions that upon execution on a computing device cause the computing device at least to:
identify at least one terminal among a plurality of terminals an enterprise intranet of a private cloud system as at least one trustworthy machine according to a predetermined rule, wherein the predetermined rule pre-sets the level of the at least one terminal as trustworthy;
store identification information of the at least one trustworthy machine in a server, wherein the server performs security control over the enterprise intranet based at least in part on the stored identification information;
receive, from a first terminal among the plurality of terminals in the enterprise intranet, an upload request for adding a file feature into a security database in the enterprise intranet, wherein the request includes an identification code of the first terminal, a directory path of a file in the first terminal, and the file feature, and the file feature is identification data for identifying the file;
determine whether the first terminal is a trustworthy machine by comparing the identification code of the first terminal to the identification information of the at least one trustworthy machine stored in the server;
add the file feature into the security database in the enterprise intranet in response to the determination that the identification code of the first terminal matches identification information of one of the at least one trustworthy machine; and
determine whether file feature information uploaded by a second terminal among the plurality of terminals in the enterprise intranet is secure based on the file feature added in the security database in the enterprise intranet by the first terminal.

12. The non-transitory computer readable medium of claim 11, wherein the identification information of the at least one trustworthy machine is stored in a configuration file or a relationship table of the server.

* * * * *